(12) United States Patent
Shin et al.

(10) Patent No.: US 8,587,744 B2
(45) Date of Patent: Nov. 19, 2013

(54) LIQUID CRYSTAL DISPLAY AND FABRICATING METHOD THEREOF

(75) Inventors: Jin-Soo Shin, Cheonan-si (KR);
Tae-Hyung Kim, Suwon-si (KR);
Jun-Hee Son, Cheonan-si (KR);
Sung-Wook Kang, Seoul (KR);
Gennady Ivanov, Suwon-si (KR); Se-Ki Park, Asan-si (KR)

(73) Assignee: Samsung Display Co., Ltd. (KR)

( * ) Notice: Subject to any disclaimer, the term of this patent is extended or adjusted under 35 U.S.C. 154(b) by 492 days.

(21) Appl. No.: 12/645,435

(22) Filed: Dec. 22, 2009

(65) Prior Publication Data

US 2010/0165244 A1   Jul. 1, 2010

(30) Foreign Application Priority Data

Dec. 26, 2008 (KR) .................. 10-2008-0134746

(51) Int. Cl.
*G02F 1/1333* (2006.01)
(52) U.S. Cl.
USPC ............... 349/58; 349/62; 362/612; 362/97.1
(58) Field of Classification Search
USPC ........................ 349/58, 62; 362/633
See application file for complete search history.

(56) References Cited

U.S. PATENT DOCUMENTS

| 5,438,484 | A * | 8/1995 | Kanda et al. ............... 362/613 |
| 7,375,775 | B2 * | 5/2008 | Kim ................................ 349/58 |
| 2005/0073621 | A1 * | 4/2005 | Lee et al. ........................ 349/53 |
| 2005/0276076 | A1 * | 12/2005 | Shin ............................... 362/633 |
| 2006/0139962 | A1 * | 6/2006 | Shin et al. ..................... 362/633 |
| 2006/0171170 | A1 * | 8/2006 | Lee ................................ 362/632 |
| 2006/0203519 | A1 * | 9/2006 | Shin et al. ..................... 362/632 |
| 2008/0048958 | A1 * | 2/2008 | Kim et al. ....................... 345/87 |
| 2008/0079865 | A1 * | 4/2008 | Kang et al. ..................... 349/61 |
| 2008/0088764 | A1 * | 4/2008 | Son et al. ....................... 349/58 |
| 2008/0266482 | A1 * | 10/2008 | Ryu ............................... 349/58 |
| 2008/0297684 | A1 * | 12/2008 | Tanaka .......................... 349/58 |
| 2008/0303971 | A1 * | 12/2008 | Lee et al. ....................... 349/58 |
| 2009/0128731 | A1 * | 5/2009 | Kwon et al. ................... 349/58 |
| 2009/0303409 | A1 * | 12/2009 | Park .............................. 349/58 |

FOREIGN PATENT DOCUMENTS

| KR | 2001-0053801 | * | 7/2001 |
| KR | 1020010053801 A | | 7/2001 |
| KR | 1020050094648 A | | 9/2005 |
| KR | 1020070014666 A | | 2/2007 |
| KR | 1020070117049 A | | 12/2007 |

* cited by examiner

*Primary Examiner* — Edward Glick
*Assistant Examiner* — Sang V Nguyen
(74) *Attorney, Agent, or Firm* — Innovation Counsel LLP

(57) ABSTRACT

A liquid crystal display and a fabricating method thereof are provided. The liquid crystal display includes a light guide plate (LGP) guiding light, a light source that is disposed at one side of the LGP, a bottom receiving container including a bottom plate disposed below the LGP and the light source and a cover that covers the light source and is integrally formed with the bottom surface, a reflective sheet member laminated inside the cover facing the light source, a reflective sheet positioned on the bottom plate, a liquid crystal panel receiving the light from the light source and displaying an image, and a top receiving container including a top plate having a window to expose the liquid crystal panel outside, and a first sidewall portion extending along the boundary of the top plate.

8 Claims, 16 Drawing Sheets

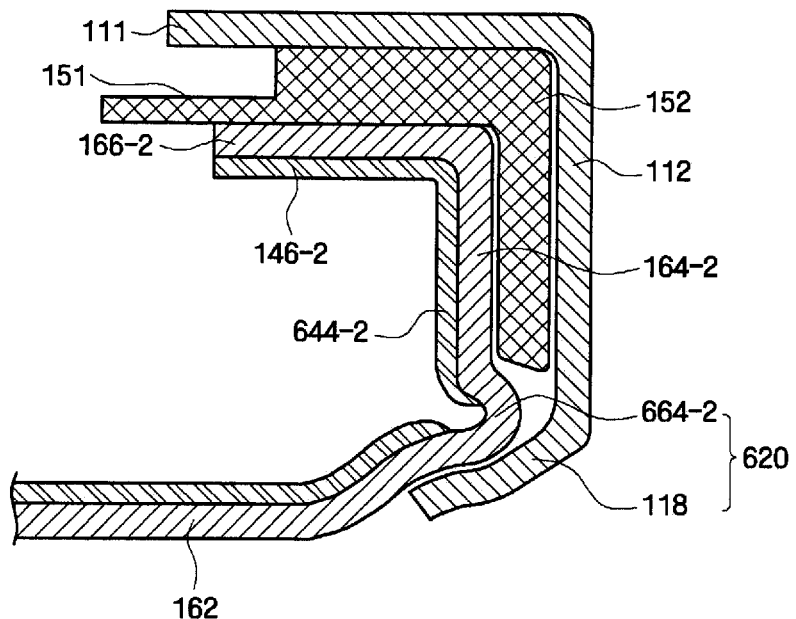
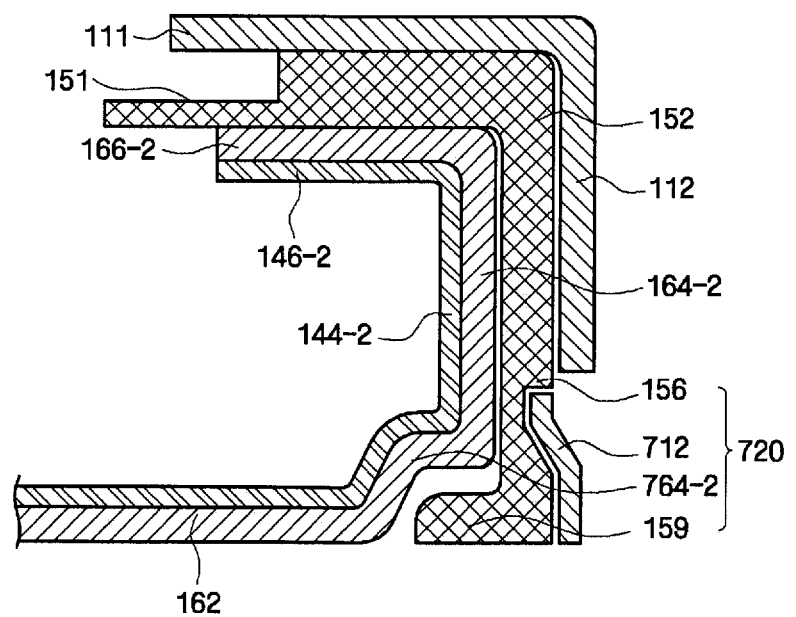

LIQUID CRYSTAL DISPLAY AND FABRICATING METHOD THEREOF

CROSS-REFERENCE TO RELATED APPLICATION

This application claims priority from Korean Patent Application No. 10-2008-0134746 filed on Dec. 26, 2008 in the Korean Intellectual Property Office, the disclosure of which is incorporated herein by reference in its entirety.

BACKGROUND OF THE INVENTION

1. Field of the Invention

The present invention relates to a liquid crystal display and a fabricating method thereof, and more particularly, to a liquid crystal display which can reduce a manufacturing cost and an assembling time while improving display quality, and a fabricating method of the liquid crystal display.

2. Description of the Related Art

A liquid crystal display (LCD) generally includes a liquid crystal display panel and a backlight assembly.

The liquid crystal display panel is provided with a first substrate on which field-generating electrodes including a pixel electrode and a common electrode are formed, a second substrate, and a liquid crystal layer that is interposed between the first and second substrates. In the LCD, an electric field is generated by applying a voltage to the field-generating electrodes to rearrange liquid crystal molecules of the liquid crystal layer, so that the polarization of incident light is controlled, thereby displaying images. The liquid crystal panel is a non-emitting device that cannot emit light by itself.

A backlight assembly is provided to irradiate light to the liquid crystal panel. In general, the backlight assembly includes a light source supplying light to the liquid crystal panel, a light source cover for covering and protecting the light source, a light guide plate (LGP) guiding the light emitted from the light source to the liquid crystal panel, one or more optical sheets provided for improving optical properties of the light guided to the liquid crystal panel, and a reflective sheet disposed below the LGP.

Accordingly, it is desirable to provide an LCD with a reduced manufacturing cost and assembly time yet with improved display quality.

SUMMARY OF THE INVENTION

The present invention provides a liquid crystal display which can be easily assembled through an automated fabrication process, thereby reducing the manufacturing cost and assembly time while improving display quality.

The present invention also provides a method of fabricating a liquid crystal display, which can reduce the manufacturing cost and assembly time while improving display quality.

The above and other objects of the present invention will be described in or be apparent from the following description of the preferred embodiments.

According to an aspect of the present invention, there is provided a liquid crystal display including a light guide plate (LGP) which guides light, a light source that is disposed at one side of the LGP, a bottom receiving container including a bottom plate disposed below the LGP and the light source and a cover that covers the light source and is integrally formed with the bottom plate, a reflective sheet member laminated inside the cover facing the light source, a reflective sheet positioned on the bottom plate, a liquid crystal panel receiving the light from the light source and displaying an image, and a top receiving container including a top plate having a window to expose the liquid crystal panel outside, and a first sidewall portion extending along the boundary of the top plate.

According to another aspect of the present invention, there is provided a method of fabricating a liquid crystal display, the method including preparing a bottom receiving container member, forming a reflective sheet member by laminating a reflective sheet member on an end of the bottom receiving container member, forming a bottom receiving container including a bottom plate and a cover integrally formed by bending the end of the bottom receiving container member, placing reflective sheets on the bottom plate, and installing a light source at the cover and a light guide plate (LGP) on the reflective sheets, respectively.

BRIEF DESCRIPTION OF THE DRAWINGS

The above and other features and advantages of the present invention will become more apparent by describing in detail preferred embodiments thereof with reference to the attached drawings in which:

FIG. 7 is a cross-sectional view of a coupling structure (620) according to a sixth embodiment of the present invention;

FIG. 8 is a cross-sectional view of a coupling structure (720) according to a seventh embodiment of the present invention;

DETAILED DESCRIPTION OF THE INVENTION

Figure 1:
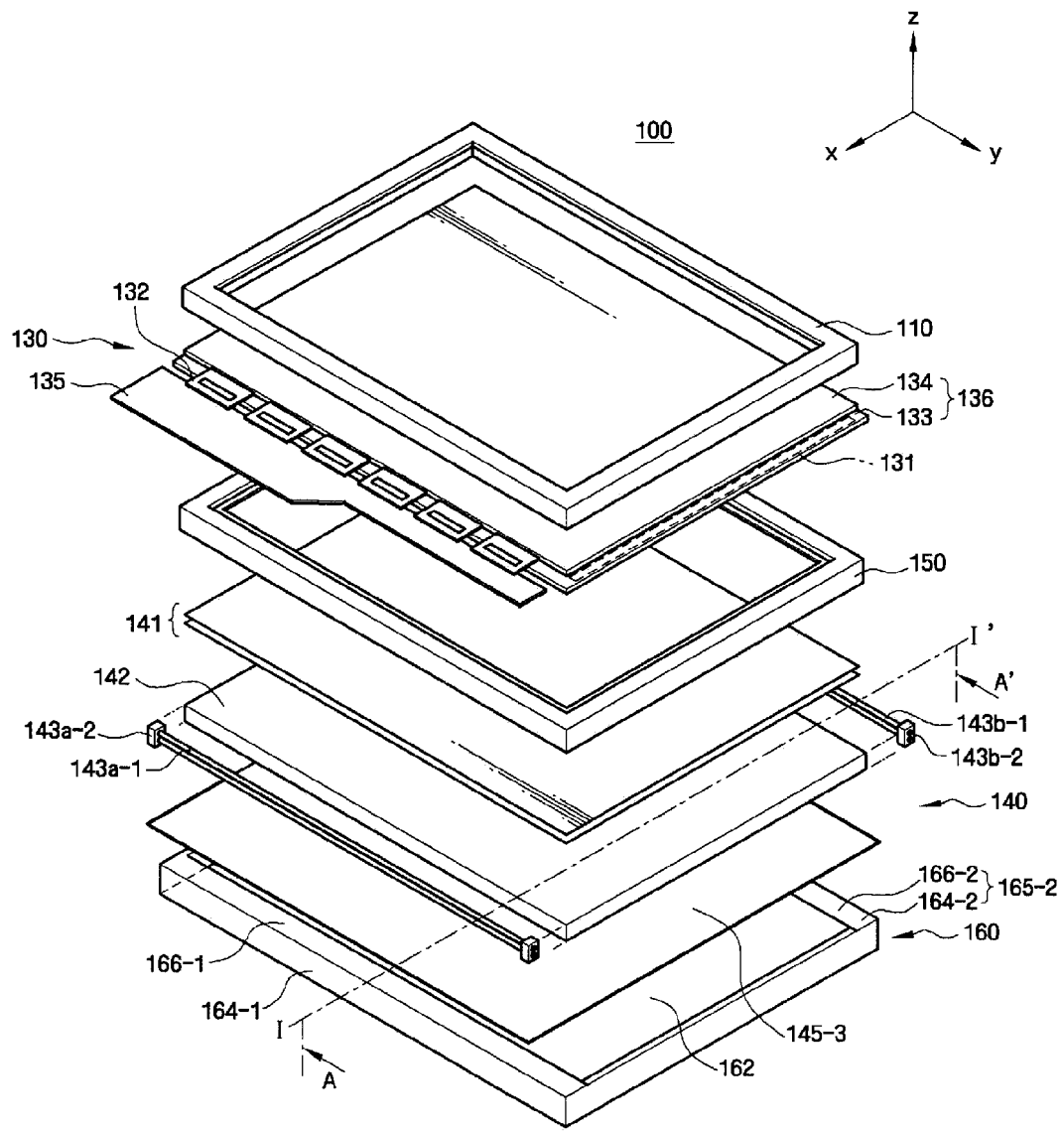
FIG. 1 is an exploded perspective view of a liquid crystal display (LCD) according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification. In the drawings, the thicknesses of layers and regions are exaggerated for clarity.

It will be understood that when an element or layer is referred to as being "on" another element or layer, it can be directly on to the other element or layer or intervening elements or layers may be present. In contrast, when an element is referred to as being "directly on" another element or layer, there are no intervening elements or layers present. As used herein, the term "and/or" includes any and all combinations of one or more of the associated listed items.

Spatially relative terms, such as "below," "beneath," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Exemplary embodiments of the present invention are described herein with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing.

Hereinafter, a liquid crystal display according to an embodiment of the present invention will be described in detail with reference to FIGS. 1 through 2D.

Figure 2A:
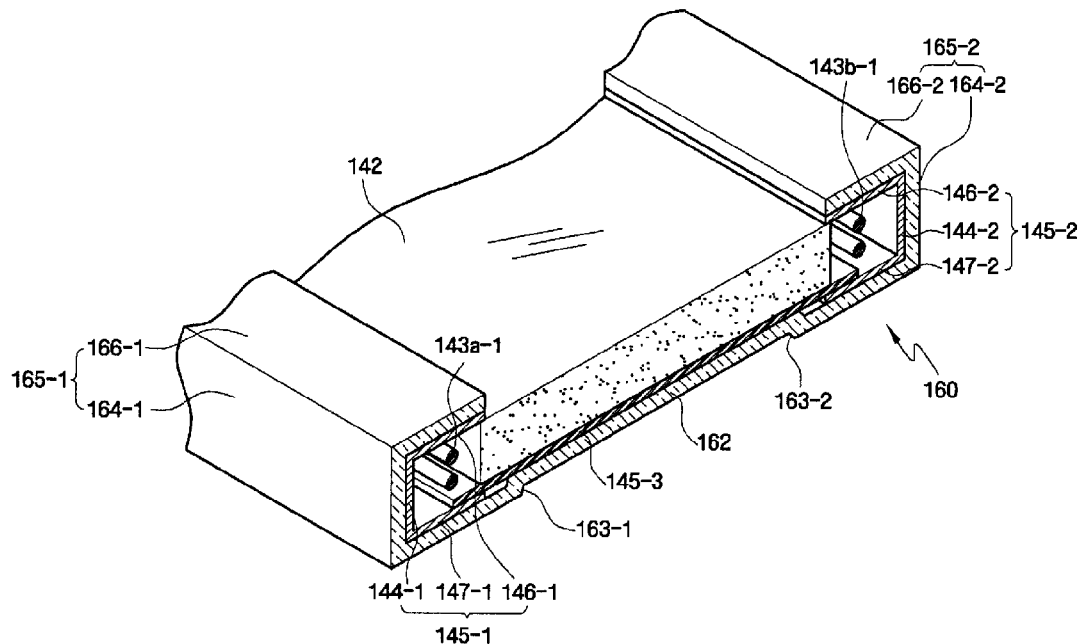
FIG. 2A is a perspective view of the LCD of FIG. 1 cut along a line I-I' as viewed from the direction AA'.
Figure 2B:
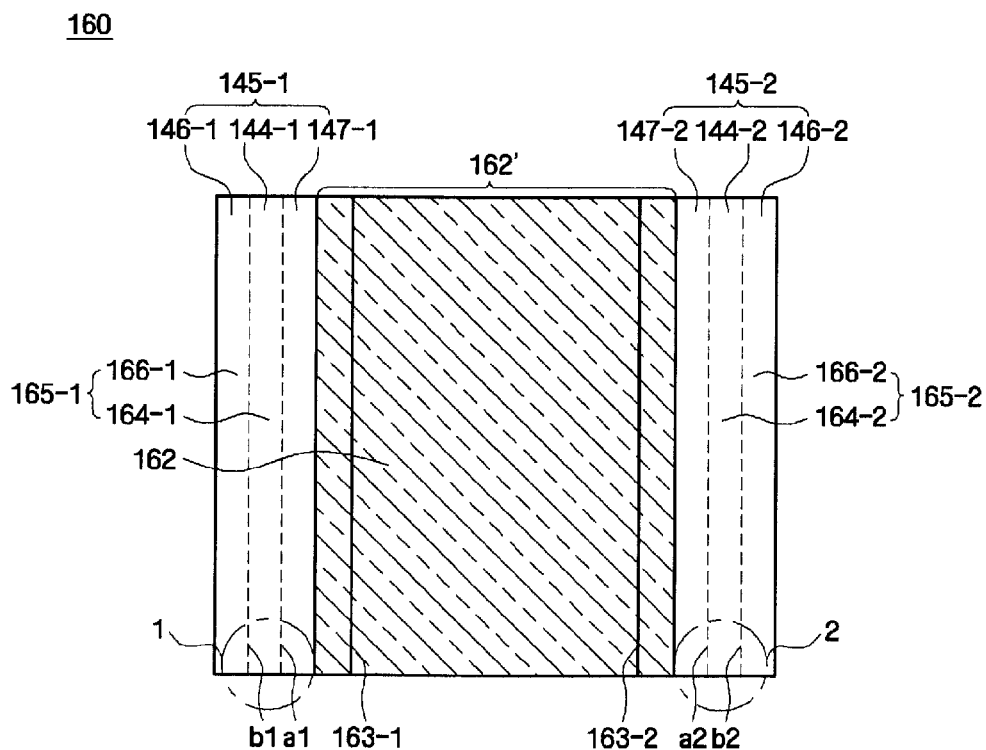
FIG. 2B is a schematic diagram of a bottom receiving container member for forming a bottom receiving container of the LCD of FIG. 1.
Figure 2C:
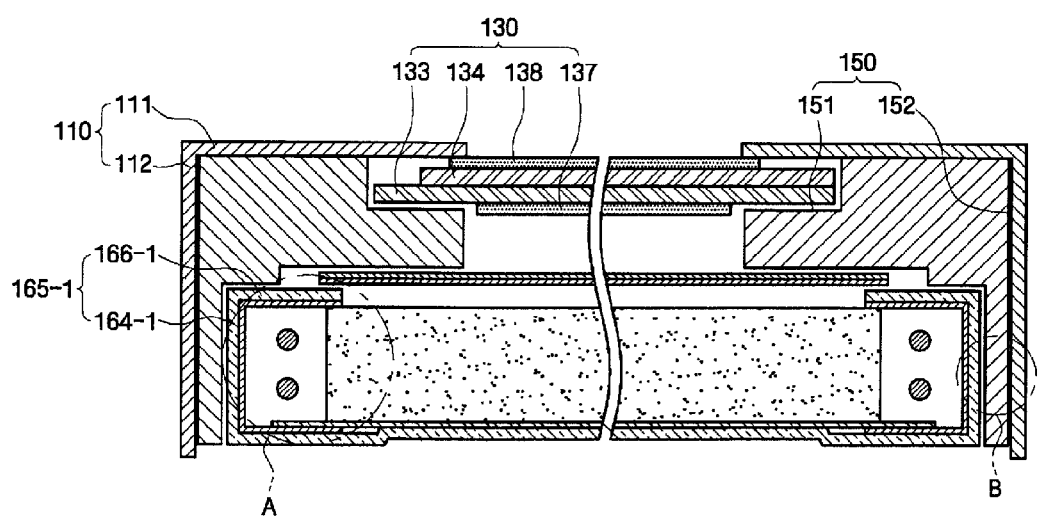
FIG. 2C is a cross-sectional view illustrating a connection relationship of the LCD of FIG. 1 taken along a line I-I'.
Figure 2D:
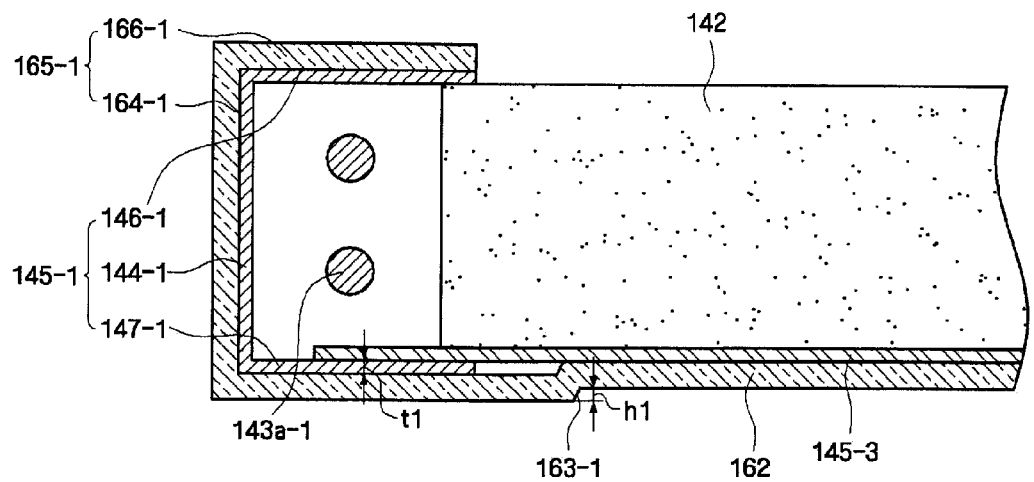
FIG. 2D is an enlarged cross-sectional view illustrating a portion "A" of FIG. 2C.

FIG. 1 is an exploded perspective view of a liquid crystal display (LCD) 100 according to an embodiment of the present invention, FIG. 2A is a perspective view of the LCD 100 of FIG. 1 cut along a line I-I' as viewed from the direction AA', FIG. 2B is a schematic diagram of a bottom receiving container member for forming a bottom receiving container of the LCD 100 of FIG. 1, FIG. 2C is a cross-sectional view illustrating a connection relationship of the LCD 100 of FIG. 1 taken along a line and FIG. 2D is an enlarged cross-sectional view illustrating a portion "A" of FIG. 2C.

Referring to FIG. 1, the LCD 100 according to the current embodiment largely includes a liquid crystal panel assembly 130, a backlight assembly 140, and receiving containers 110, 150, and 160.

The liquid crystal panel assembly 130 includes a liquid crystal panel 136 having a first substrate 133, a second substrate 134 opposing the first substrate 133, and a liquid crystal molecular layer (not shown) sandwiched between the first and second substrates 133 and 134, a first polarizing plate (137 in FIG. 4) disposed beneath the liquid crystal panel 136, a second polarizing plate (138 in FIG. 4) disposed on the liquid crystal panel 136, a gate driving IC 131, a data chip film package 132, and a printed circuit board (PCB) 135.

In the liquid crystal panel 136, the first substrate 133 may include a plurality of gate lines (not shown), a plurality of data lines (not shown), a thin film transistor (TFT) array, and a pixel electrode. The second substrate 134 includes a color filter, a black matrix, and a common electrode. In this case, the color filter and the common electrode may be disposed on the first substrate 133. Here, the color filter and the common electrode may be formed on the first substrate 133.

A first polarizing plate (not shown) polarizes light which is incident on the liquid crystal panel 136. A second polarizing plate (not shown) polarizes light exiting the liquid crystal panel 136.

The liquid crystal panel 136 receives light from outside and controls the amount of light transmitting a liquid crystal molecular layer (not shown) interposed between the first substrate 133 and the second substrate 134 in order to display a desired image.

The gate driving IC 131 is disposed on the first substrate 133 and connected to the plurality of gate lines (not shown) formed on the first substrate 133. The data chip film package 132 may be connected to the plurality of data lines (not shown) formed on the first substrate 133. Here, an example of the data chip film package 132 used in the present invention includes a tape automated bonding (TAB) tape which includes wiring patterns formed on a base film and a semiconductor chip bonded to the wiring patterns by a TAB technique. Examples of the chip film package of the present invention include, but are not limited to, a tape carrier package (TCP), a chip on film (COF), and the like.

The PCB 135 may include drive components for respectively inputting a gate driving signal and a data driving signal to the gate driving IC 131 and the data chip film package 132.

The backlight assembly 140 includes an LGP 142 which guides light, a first light source unit 143a-1 and a second light source unit 143b-1 which emit light, first and second reflective sheet members 145-1 and 145-2 enclosing the first and second light sources 143a-1 and 143b-1, a third reflective sheet member 145-3 disposed below the LGP 142, and at least one optical sheet 141.

The LGP 142 guides light emitted from the first and second light sources 143a-1 and 143b-1 toward the liquid crystal panel 136 disposed above the LGP 142. The LGP 142 may be made of a transparent plastic material such as acryl. The LGP 142 may have various patterns formed on the bottom surface thereof so as to change the propagation direction of light incident into the LGP 142 towards the liquid crystal panel 136.

A first light source unit may include the first light source 143a-1 and a first lamp holder 143a-2. Similarly, a second light source unit may include the second light source 143b-1 and a second lamp holder 143b-2. The first and second light sources 143a-1 and 143b-1 are disposed at two opposing sides of the LGP 142 to provide light. As shown in FIG. 1 through 2D, the first and second light sources 143a-1 and 143b-1 may be line light sources. Examples of the line sources may include a Cold Cathode Fluorescent Lamp (CCFL), a Hot Cathode Fluorescent Lamp (HCFL), and the like.

First lamp holders 143a-2 are disposed at both ends of the first light source 143a-1 and fix the first light source 143a-1. Likewise, second lamp holders 143b-2 are disposed at both ends of the second light source 143b-1 and fix the second light source 143b-1. The first and second light sources 143a-1 and 143b-1 may be electrically connected to an inverter (not shown) so as to receive power from the inverter.

The first reflective sheet member 145-1 is placed inside a first cover 165-1 covering the first light source 143a-1. The first reflective sheet member 145-1 reflects the light emitted from the first light source 143*a*-1 toward the first cover 165-1 and a bottom plate 162 so as to be incident on one surface of the LGP 142.

The second reflective sheet member 145-2 is placed inside a second cover 165-2 covering the second light source 143*b*-1. The second reflective sheet member 145-2 reflects the light emitted from the second light source 143*b*-1 toward the second cover 165-2 and the bottom plate 162 so as to be incident on the other surface of the LGP 142. The third reflective sheet member 145-3 is disposed below the LGP 142 and reflects the light passing downward through the bottom surface of the LGP 142 upwards from the LGP 142.

More specifically, the first and second reflective sheet members 145-1 and 145-2 reflect light that is not reflected by a fine dot pattern formed on the bottom surface of the LGP 142 back toward a light exiting surface of the LGP 142, thereby reducing loss of light that is incident on the liquid crystal panel 136 and increasing the uniformity of light transmitted through the light exit surface of the LGP 142.

The at least one optical sheet 141 is disposed above the LGP 142 and diffuses and condenses light passing through the LGP 142. The at least one optical sheet 141 may include a diffusion sheet, a prism sheet, and a protection sheet. The diffusion sheet is disposed between the LGP 142 and the prism sheet and diffuses light incident through the LGP 142 to prevent partial concentration of light. The prism sheet has a plurality of triangular prisms aligned on a top surface thereof and condenses light diffused by the diffusion sheet in a direction perpendicular to the liquid crystal panel 136. The protection sheet is disposed on the prism sheet to protect a surface of the prism sheet and scatters incident light to make distribution of light uniform.

The receiving containers 110, 150 and 160 may include a bottom receiving container 160, an intermediate receiving container 150, and a top receiving container 110.

The bottom receiving container 160 is adapted to sequentially receive therein the first and second reflective sheet members 145-1 and 145-2, the third reflective sheet member 145-3, the first and second light sources 143*a*-1 and 143*b*-1, the LGP 142, and the at least one optical sheet 141. The bottom receiving container 160 may be formed of a metallic material that can withstand an external shock and has grounding capability.

The bottom receiving container 160 may include a bottom plate 162 and first and second covers 165-1 and 165-2.

Referring to FIG. 2A and FIG. 2B, the first and second covers 165-1 and 165-2 are formed by bending a first end 1 and a second end 2, respectively, of a bottom receiving container member 160, which is depicted in FIG. 2B. Meanwhile, the first and second covers 165-1 and 165-2 enclose the first and second light sources 143*a*-1 and 143*b*-1 respectively. Here, a middle portion between the first end 1 and the second end 2 of the bottom receiving container member, that is, a portion that is not bent, corresponds to the bottom plate 162. Accordingly, the first and second covers 165-1 and 165-2 are integrally formed with the bottom plate 162. The bottom receiving container 160 includes the first and second covers 165-1 and 165-2 and the bottom plate 162, which are integrally formed with each other.

The first cover 165-1 includes a first sidewall 164-1 extending and bent from the first end 1 of the bottom receiving container member, and a first top plate 166-1 extending and bent from the first sidewall 164-1. The second cover 165-2 includes a second sidewall 164-2 extending and bent from the second end 2 of the bottom receiving container member, and a second top plate 166-2 extending and bent from the second sidewall 164-2. Accordingly, each light source cover is integrally formed with the bottom receiving container. Therefore, a separate light source cover is not necessarily provided. In addition, a separate fixing means for fixing the light source cover to the bottom receiving container is not necessarily provided.

Referring to FIG. 2B, which depicts the bottom receiving container member before it is formed into the bottom receiving container, said bottom receiving container member includes the first and second ends 1 and 2.

The first reflective sheet member 145-1 is a laminated film formed at the first end 1. The second reflective sheet member 145-2 is a laminated film formed at the second end 2. Meanwhile, a portion 162' that is not laminated with the first and second reflective sheet members 145-1 and 145-2 may exist between the first and second ends 1 and 2. The third reflective sheet member 145-3 is disposed on the portion 162'. The third reflective sheet member 145-3 may also be disposed to partially overlap first and second reflective sheet films 147-1 and 147-2.

Bending grooves a1, b1, a2 and b2 may be formed at the first and second ends 1 and 2 of the bottom receiving container member to facilitate bending when forming the first and second covers 165-1 and 165-2. The bending grooves a1, b1, a2 and b2 may also be formed on the first and second reflective sheet films 147-1 and 147-2, which films are laminated on the first and second ends 1 and 2 to overlap the first and second ends 1 and 2.

The first and second sidewalls 164-1 and 164-2 are formed by bending the bending grooves a1 and a2, respectively. In addition, the first and second top plates 166-1 and 166-2 are formed by bending the bending grooves b1 and b2, respectively. Accordingly, the first and second covers 165-1 and 165-2 may be shaped substantially in an upside-down "L"-shape form.

Further, when forming the first and second covers 165-1 and 165-2 by bending the first and second ends 1 and 2, the first and second reflective sheet members 145-1 and 145-2 laminated at the first and second ends 1 and 2 can be simultaneously bent by the bending grooves a1, b1, a2 and b2. Accordingly, the first and second covers 165-1 and 165-2 may also enclose the first and second reflective sheet members 145-1 and 145-2 laminated therein. Here, the first and second reflective sheet members 145-1 and 145-2 may include first and second reflective sheet films (146-1 and 146-2 of FIG. 2A) laminated on portions of first and second top plates 166-1 and 166-2, first and second reflective sheet films (144-1 and 144-2 of FIG. 2A) laminated on portions of the first and second sidewalls 164-1 and 164-2, and first and second reflective sheet films (147-1 and 147-2 of FIG. 2A) laminated on portions of the bottom plate 162 adjacent to the first and second sidewalls 164-1 and 164-2, respectively. That is to say, the first and second reflective sheet members 145-1 and 145-2 may extend from the first and second top plates 166-1 and 166-2 to portions of the bottom plate 162 adjacent to the first and second sidewalls 164-1 and 164-2. The first and second reflective sheet members 145-1 and 145-2 are formed substantially in a "C"-shaped form.

The first reflective sheet member 145-1 encloses the first light source 143*a*-1 and totally reflects the light emitted from the first light source 143*a*-1 toward the LGP 142. The second reflective sheet member 145-2 encloses the second light source 143*b*-1 and totally reflects the light emitted from the second light source 143*b*-1 toward the LGP 142. That is to say, the first and second reflective sheet members 145-1 and 145-2 are capable of condensing the light emitted from the first and second light sources 143*a*-1 and 143*b*-1 toward the LGP 142.

The first and second reflective sheet members 145-1 and 145-2 and the third reflective sheet member 145-3 may be made of silver (Ag), which easily reflects light. In addition, the first and second reflective sheet members 145-1 and 145-2 and the third reflective sheet member 145-3 made of silver (Ag) may be disposed between the backlight assembly 140 and the liquid crystal panel 136 so as to reduce interference between electrical signals for driving the backlight assembly 140 and for driving the liquid crystal panel 136. That is, silver (Ag) used to make the first and second reflective sheet members 145-1 and 145-2 and the third reflective sheet member 145-3 may function as a stopper for preventing waterfall noise.

The bottom plate 162 may have embossings (not shown) for fixing the PCB, etc. The reflective sheet member is laminated on the entire surface of the bottom plate 162, and embossings for fixing the PCB, etc. are formed, thereby also forming the embossings on the reflective sheet members laminated on the bottom plate 162. That is to say, wrinkles may be caused in the reflective sheet members laminated on the bottom plate 162. Accordingly, dark portions may appear on the LCD, thereby reducing the overall picture quality of the LCD.

Therefore, after forming the embossings on the reflective sheet members laminated on the bottom plate 162, if the third reflective sheet member 145-3 having a predetermined thickness and appropriate strength is disposed on the resultant sheet structure, the wrinkles of the reflective sheet members can be alleviated or prevented. In addition, the dark portions can be prevented from appearing on the LCD. Further, the overall picture quality of the LCD can be considerably improved. That is to say, according to the present invention, a bottom receiving container is formed by partially laminating a reflective sheet member, thereby considerably alleviating or preventing the reduction of picture quality due to the sheet wrinkles.

Figure 2E:
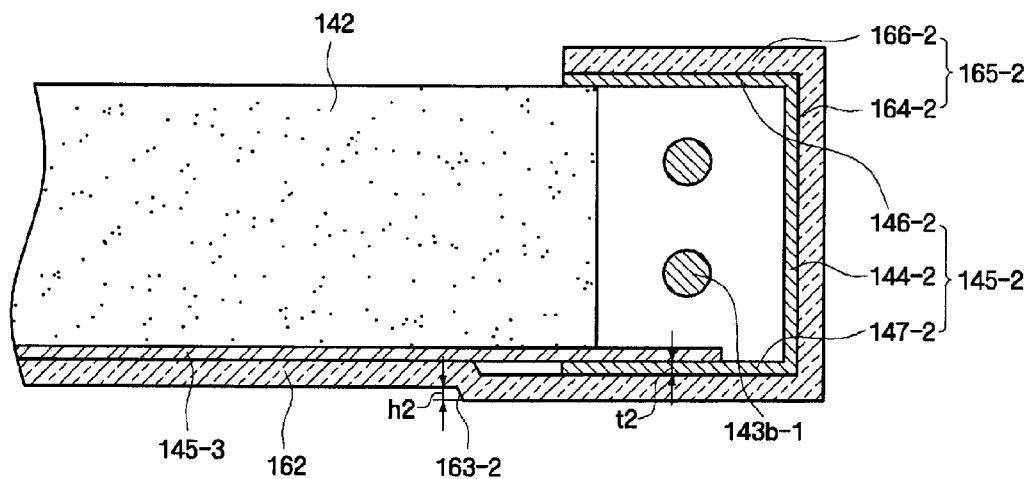
FIG. 2E is an enlarged cross-sectional view illustrating a portion "B" of FIG. 2C.

Referring to FIGS. 2A, 2D and 2E, the bottom plate 162 may have first and second stepped portions 163-1 and 163-2. Here, the first and second stepped portions 163-1 and 163-2 are formed on portions of the bottom plate 162, which are not laminated with the first and second reflective sheet members 145-1 and 145-2.

The first and second stepped portions 163-1 and 163-2 may also be formed to be adjacent to one end of the first and second reflective sheet films 147-1 and 147-2 laminated on the bottom plate 162. Here, heights h1 and h2 of the first and second stepped portions 163-1 and 163-2 are preferably equal to thicknesses t1 and t2 of the first and second reflective sheet films 147-1 and 147-2. Meanwhile, the first and second stepped portions 163-1 and 163-2 are formed to extend in parallel with the first and second sidewalls 164-1 and 164-2 in a lengthwise direction.

The first and second stepped portions 163-1 and 163-2 allow the laminated portions laminated with the first and second reflective sheet members 145-1 and 145-2 to be substantially coplanar with the unlaminated portions of the bottom plate 162. Accordingly, it is possible to prevent the third reflective sheet member 145-3, the LGP 142, and other elements disposed on the third reflective sheet member 145-3 from being disposed obliquely on the bottom plate 162 due to the step heights generated by the thicknesses t1 and t2 of the first and second reflective sheet members 145-1 and 145-2. The first and second reflective sheet members 145-1 and 145-2 may have the same or different thicknesses. In addition, reduction in brightness as well as leakage of light, which would result if the third reflective sheet member 145-3, the LGP 142, and other elements disposed on the third reflective sheet member 145-3 were obliquely disposed, can be prevented.

Referring to FIGS. 1 and 2C, the intermediate receiving container 150 may include a supporting portion 151 on which the liquid crystal panel 136 is seated. The intermediate receiving container 150 may be a rectangular frame shape with a second sidewall portion 152 extending from the supporting portion 151 and having four sidewalls. The second sidewall portion 152 may be formed to extend in parallel with the first and second sidewalls 164-1 and 164-2 of the bottom receiving container 160. In addition, portions extending from the support portion 151 may be seated on the first and second top plates 166-1 and 166-2 of the bottom receiving container 160. In order to protect components fixed to the intermediate receiving container 150 against breakage, the intermediate receiving container 150 may be formed by a mold frame made of, for example, a plastic material.

The top receiving container 110 is combined with the intermediate receiving container 150 to fix the liquid crystal panel 136. The top receiving container 110 has a top plate portion 111 having a window to expose the liquid crystal panel 136 outside, and a first sidewall portion 112 extending along the boundary of the top plate portion 111.

In the LCD 100 according to the present invention, the bottom receiving container 160 and the top receiving container 110 are combined with each other by a coupling portion. In addition, the bottom receiving container 160 and the top receiving container 110 may also be combined with each other by coupling the bottom receiving container 160, the intermediate receiving container 150 and the top receiving container 110.

FIGS. 3A through 8 illustrate coupling between the bottom receiving container 160 and the top receiving container 110 or coupling between the bottom receiving container 160, the intermediate receiving container 150 and the top receiving container 110. Hereinafter, structures of the coupling will be described in detail with reference to FIGS. 3A through 8, which are enlarged views of a portion "B" of FIG. 2C. Specifically, FIGS. 3A through 8 illustrate the coupling relationship between each of the bottom receiving container 160, the intermediate receiving container 150, and the top receiving container 110 with regard to the second sidewall 164-2 of the bottom receiving container 160.

FIGS. 3A through 3D illustrate first coupling portions 264-2 and 364-2 and second coupling portions 212 and 312 according to the first and second embodiments of the present invention, respectively.

Referring to FIGS. 3A through 3D, the second sidewall 164-2 includes first coupling portions 264-2 and 364-2, and the first sidewall portion 112 includes second coupling portions 212 and 312. In the coupling structures according to the first and second embodiments of the present invention, the first coupling portions 264-2 and 364-2 contact the second coupling portions 212 and 312, respectively.

Figure 3A:
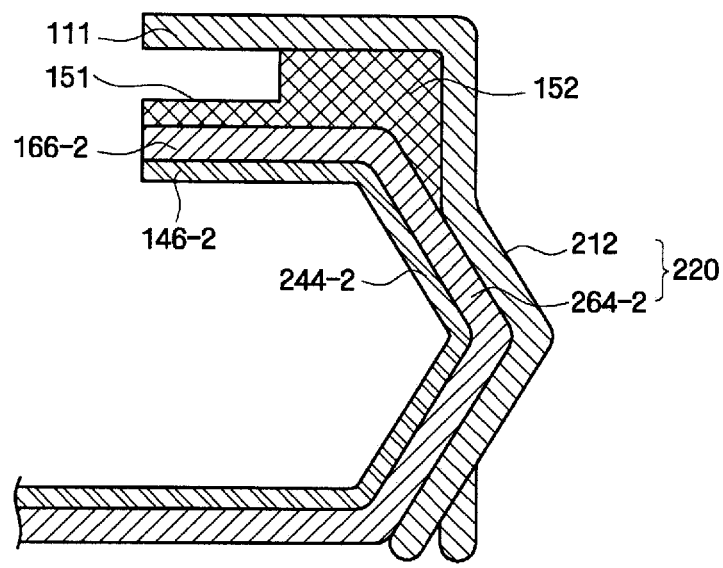
FIGS. 3A and 3B are a cross-sectional view and a perspective view of a coupling structure (220) according to a first embodiment of the present invention.
Figure 3B:
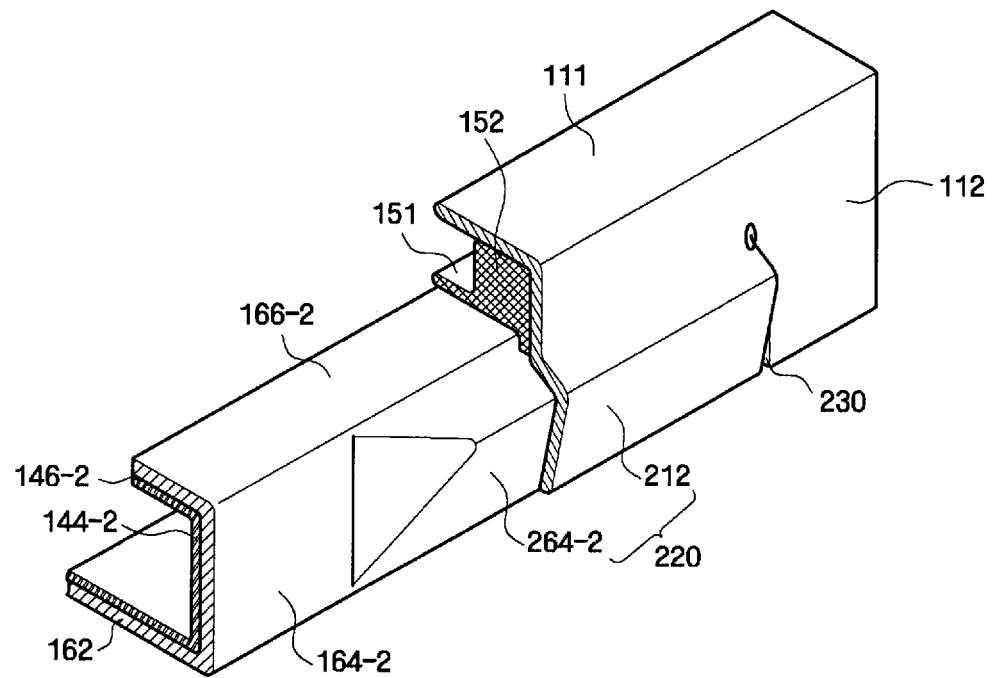

FIGS. 3A and 3B are a cross-sectional view and a perspective view of a coupling structure (220) according to the first embodiment of the present invention.

The first coupling portion 264-2 is formed by pressing portions of the second sidewall 164-2 so that it protrudes outwardly. Accordingly, the second reflective sheet member 145-2 positioned inside the second sidewall 164-2 is also outwardly pressed to form a bending portion 244-2. Meanwhile, the second coupling portion 212 is formed by outwardly bending a portion of the first sidewall portion 112. Here, a notch 230 may be formed to facilitate the portion of the first sidewall portion 112 to be outwardly bent. The first coupling portion 264-2 and the second coupling portion 212 are made to contact each other. In this way, the bottom receiving container 160 and the top receiving container 110 are coupled to each other.

Figure 3C:
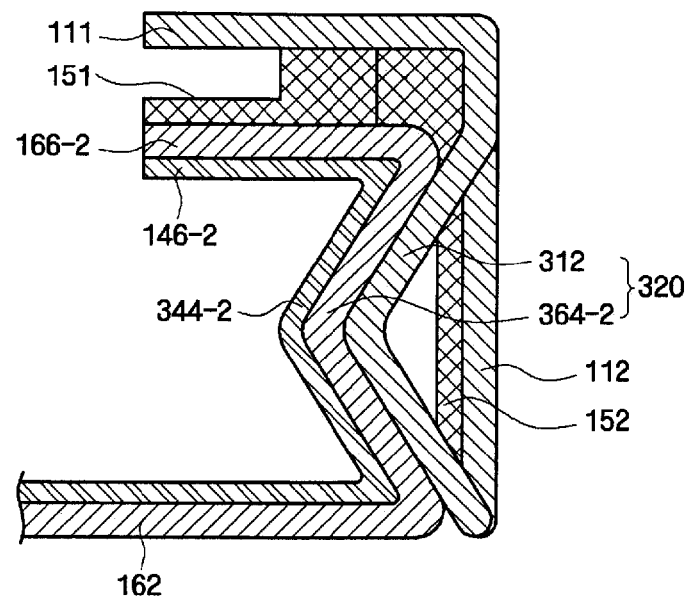
FIGS. 3C and 3D are a cross-sectional view and a perspective view of a coupling structure (320) according to a second embodiment of the present invention.
Figure 3D:
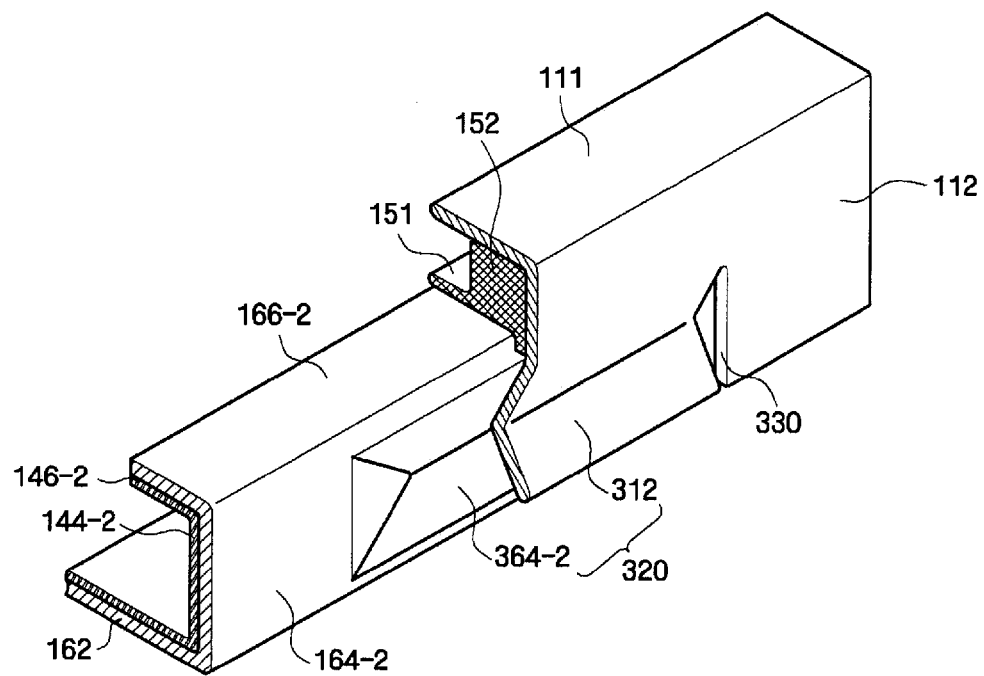

FIGS. 3C and 3D are a cross-sectional view and a perspective view of a coupling structure (320) according to the second embodiment of the present invention.

The first coupling portion 364-2 is formed by pressing a portion of the second sidewall 164-2 so that it is inwardly recessed. Accordingly, the second reflective sheet member 145-2 positioned inside the second sidewall 164-2 is also inwardly recessed to form a bending portion 344-2. Meanwhile, the second coupling portion 312 is formed by inwardly bending a portion of the first sidewall portion 112. Here, a notch 330 may be formed to facilitate the portion of the first sidewall portion 112 to be inwardly bent. The first coupling portions 364-2 and the second coupling portions 312 are made to contact each other. In this way, the bottom receiving container 160 and the top receiving container 110 are coupled to each other.

Figure 4A:
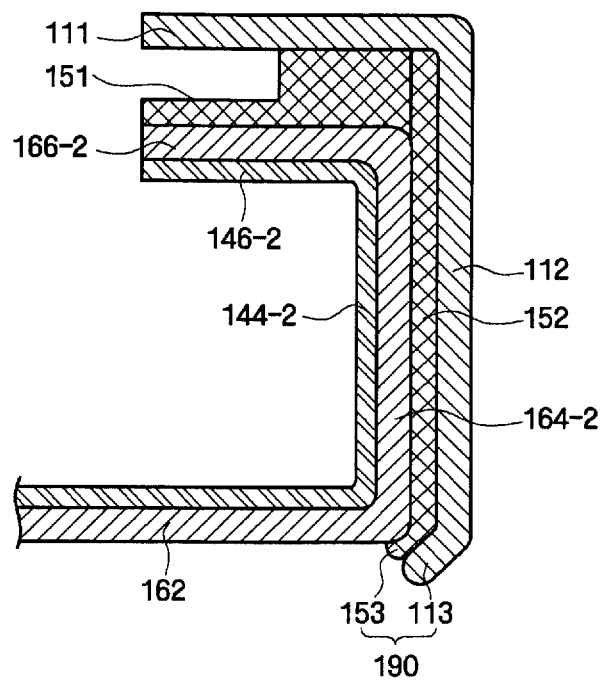
FIGS. 4A and 4B are a cross-sectional view and a perspective view of a coupling structure (190) according to a third embodiment of the present invention.
Figure 4B:
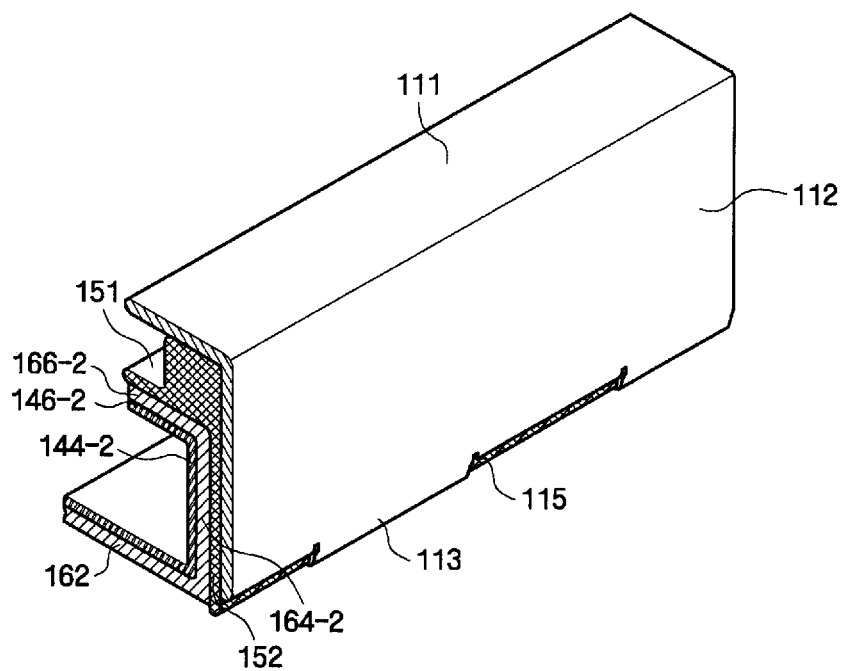

FIGS. 4A and 4B are a cross-sectional view and a perspective view of a coupling structure (190) according to a third embodiment of the present invention.

Referring to FIGS. 4A and 4B, a bottom end 153 of the second sidewall portion 152 is bent to enclose a corner of the bottom receiving container 160 where the second sidewall 164-2 meets the bottom plate 162. In addition, a bottom end 113 of the first sidewall portion 112 is bent to enclose the bottom end 153 of the second sidewall portion 152. A notch 115 may be formed at the first sidewall portion 112 to facilitate bending of the bottom end 113 of the first sidewall portion 112.

According to the third embodiment of the present invention, the bottom receiving container 160, the intermediate receiving container 150, and the top receiving container 110 can be coupled to one another by slightly changing the first and second sidewalls 164-1 and 164-2, the first sidewall portion 112 and the second sidewall portion 152.

Figure 5A:
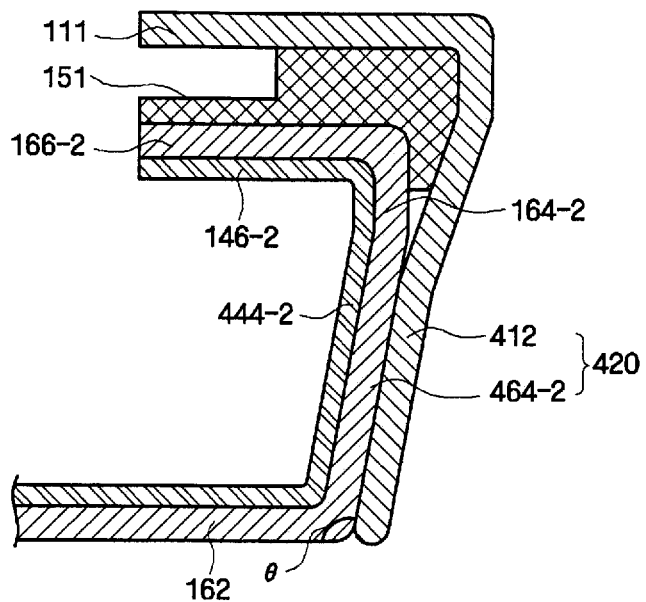
FIGS. 5A and 5B are a cross-sectional view and a perspective view of a coupling structure (420) according to a fourth embodiment of the present invention.
Figure 5B:
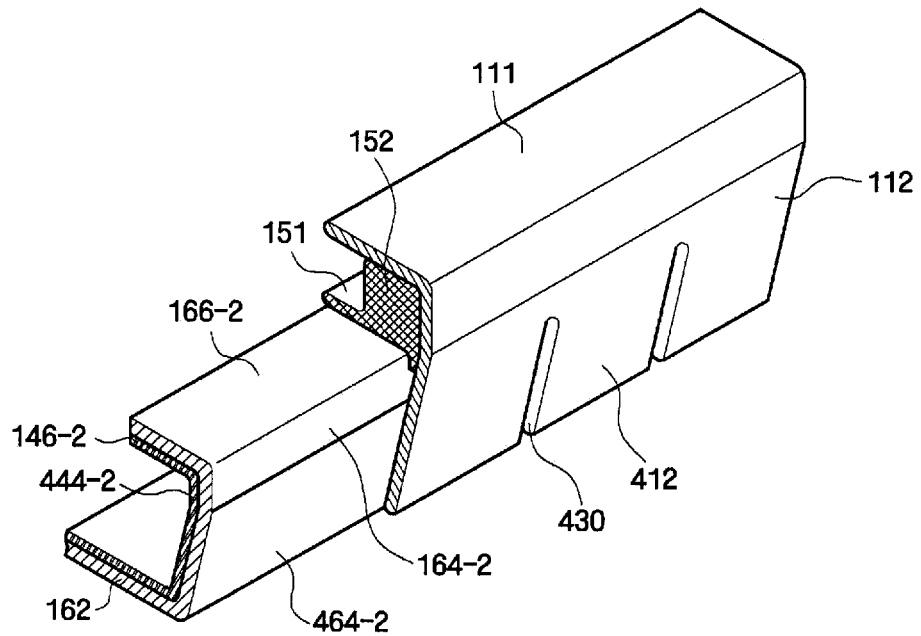

FIGS. 5A and 5B are a cross-sectional view and a perspective view of a coupling structure (420) according to a fourth embodiment of the present invention.

Referring to FIGS. 5A and 5B, a portion 464-2 of the second sidewall 164-2 is bent to form an obtuse angle (θ) with respect to the bottom plate 162. In addition, a portion 412 of the first sidewall portion 112 is bent to form an obtuse angle (θ) with respect to an imaginary line extending from the bottom plate 162 so as to be parallel with the portion 464-2 of the second sidewall 164-2. Here, a notch 430 may be formed at the first sidewall portion 112 to facilitate bending of the portion 412 of the first sidewall portion 112.

According to the fourth embodiment of the present invention, the bottom receiving container 160 can be coupled to the top receiving container 110 by allowing the portion 464-2 of the second sidewall 164-2 and the portion 412 of the first sidewall portion 112 to contact to each other. That is to say, the bottom receiving container 160 and the top receiving container 110 can be coupled to each other by slightly changing the second sidewall 164-2 and the first sidewall portion 112.

FIGS. 6A through 6E are side views and a cross-sectional view of a coupling structure (520) according to a fifth embodiment of the present invention.

Referring to FIGS. 6A through 6E, the coupling structure 520 according to the fifth embodiment of the present invention includes a hooking protrusion 564-2, a coupling hole 155, and a hitch projection 512.

Figure 6A:
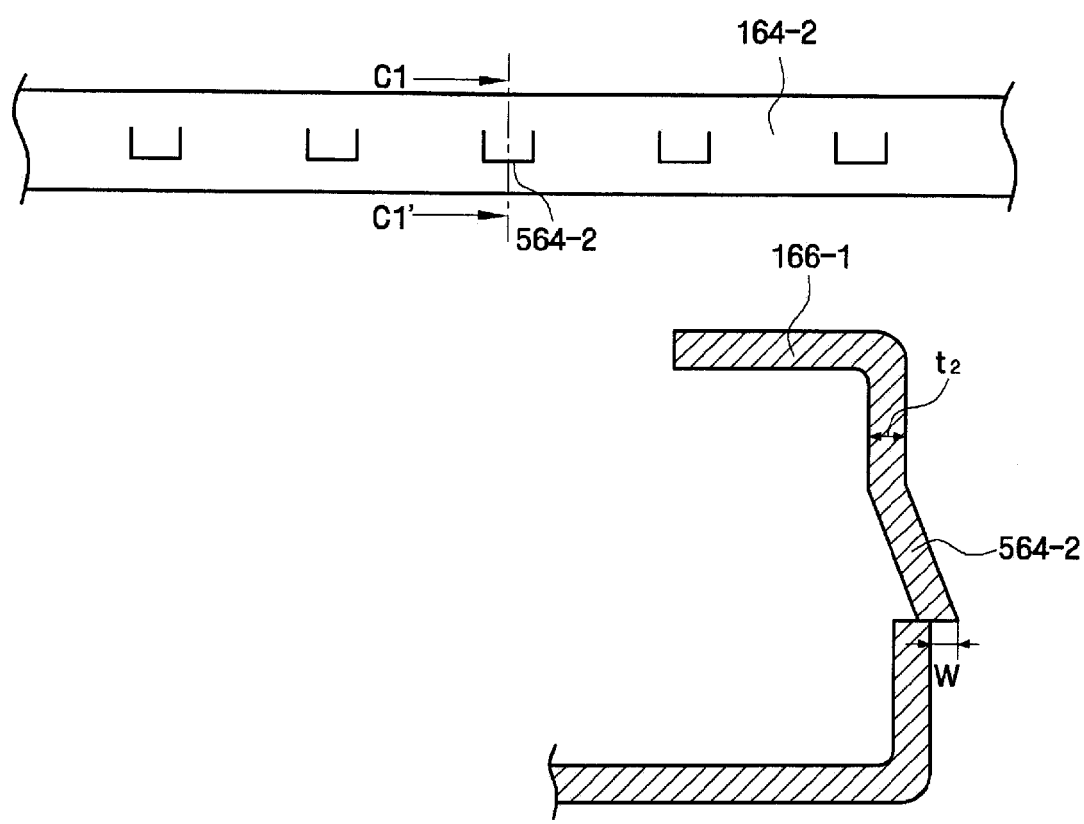
FIGS. 6A through 6E are side views and a cross-sectional view of a coupling structure (520) according to a fifth embodiment of the present invention.

FIG. 6A illustrates a structure of the hooking protrusion 564-2 formed in the second sidewall 164-2 of the bottom receiving container 160. The second sidewall 164-2 includes a plurality of hooking protrusions 564-2 spaced apart from each other by a predetermined interval. The hooking protrusions 564-2 are formed by outwardly pressing portions of the second sidewall 164-2.

Here, a width W of each of the hooking protrusions 564-2 is preferably smaller than a thickness $t_2$ of the first or second sidewall 164-1 or 164-2. If the width W of the hooking protrusions 564-2 is equal to or larger than the thickness $t_2$ of the first or second sidewall 164-1 or 164-2, the hooking protrusions 564-2 may cause cracks to form in the first and/or second sidewall 164-1 or 164-2. Thus, the light generated from the first and second light sources 143a-1 and 143b-1 may leak outside, which is called a light leakage phenomenon. The light leakage phenomenon may reduce the overall brightness of the LCD, thereby ultimately lowering the overall picture quality.

Figure 6B:
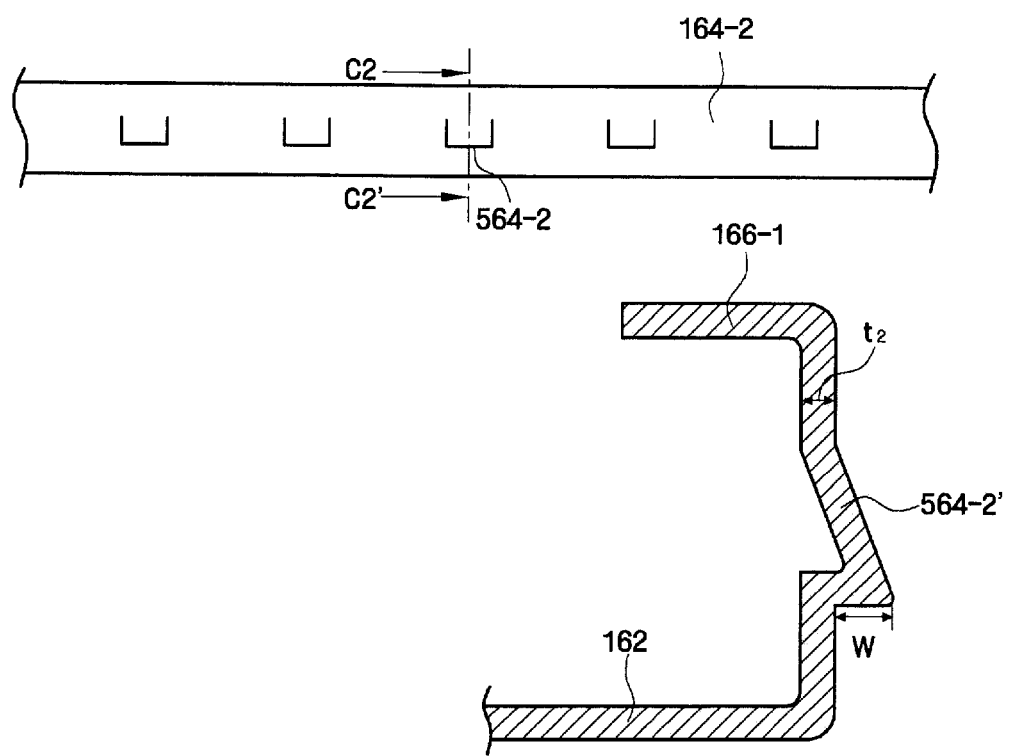

FIG. 6B illustrates an exemplary hooking protrusion 564-2' in a case where a bottom receiving container for first and second sidewalls is flexible.

Figure 6C:
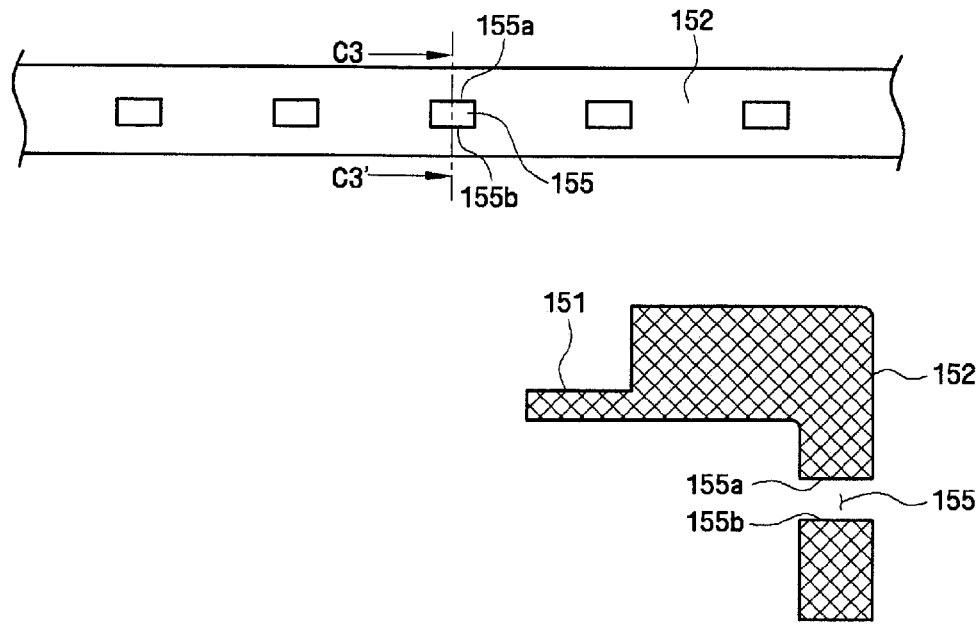

FIG. 6C illustrates a structure of the coupling hole 155 formed in the second sidewall portion 152 of the intermediate receiving container 150. The second sidewall portion 152 includes a plurality of coupling holes 155 spaced apart from each other by a predetermined interval. Here, each of the plurality of coupling holes 155 has a top end 155a and a bottom end 155b.

Figure 6D:
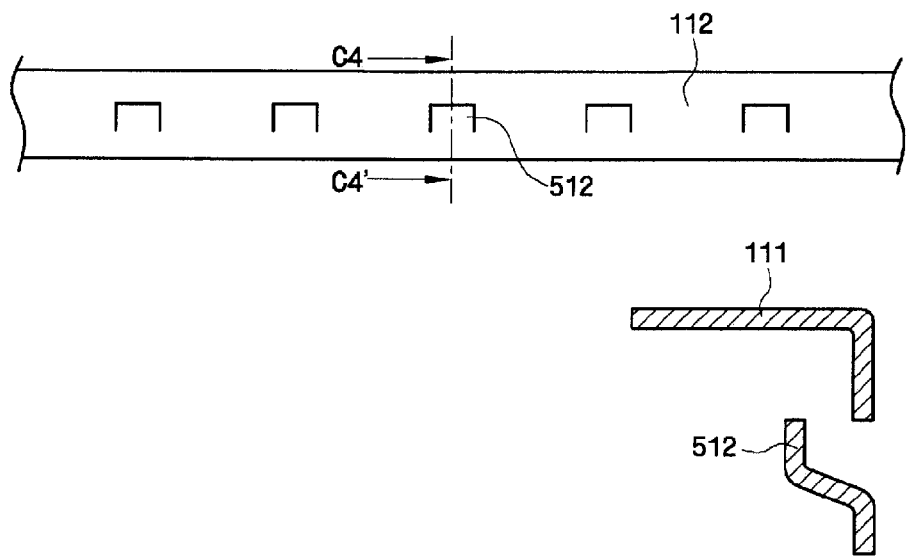

FIG. 6D illustrates a structure of the hitch projection 512 formed in the first sidewall portion 112 of the top receiving container 110. The first sidewall portion 112 includes a plurality of hitch projections 512 spaced apart from each other by a predetermined interval. The plurality of hitch projections 512 are formed by cutting a portion of the first sidewall portion 112 and inwardly bending an interior portion in view of the cutting line.

Figure 6E:
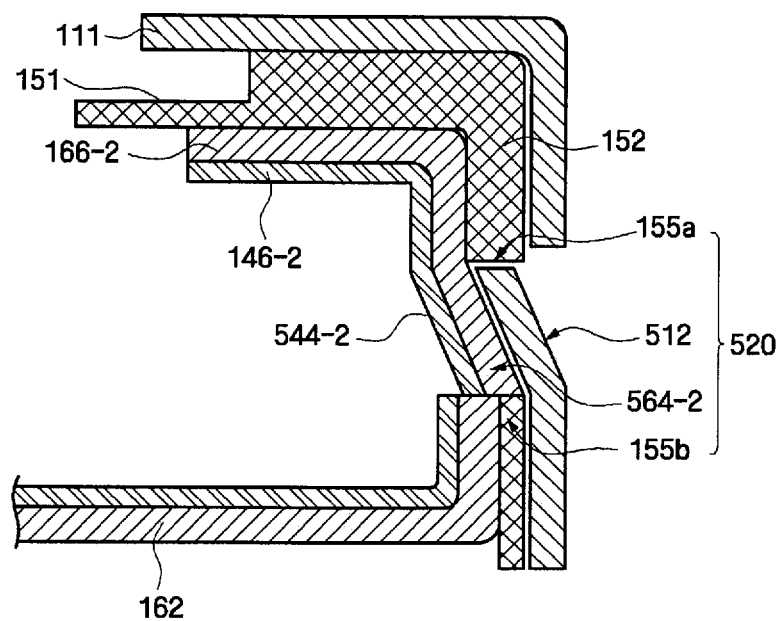

FIG. 6E illustrates a coupled state by the coupling structure 520 according to the fifth embodiment of the present invention, including the hooking protrusion 564-2, the coupling hole 155 and the hitch projections 512. According to the fifth embodiment of the present invention, the bottom receiving container 160, the intermediate receiving container 150 and the top receiving container 110 are coupled to one another such that the hooking protrusion 564-2 is coupled to the bottom end 155b of the coupling hole 155, and the hitch projection 512 is coupled to the top end 155a of the coupling hole 155.

FIG. 7 is a cross-sectional view of a coupling structure (620) according to a sixth embodiment of the present invention.

In the coupling structure 620 according to the sixth embodiment of the present invention, the second sidewall 164-2 includes a hooking protrusion 664-2 formed by outwardly pressing a portion of the sidewall 164-2. A bottom end 118 of the first sidewall portion 112 is bent to enclose the hooking protrusion 664-2. In this way, the bottom receiving container 160 and the top receiving container 110 are coupled to each other.

FIG. 8 is a cross-sectional view of a coupling structure (720) according to a seventh embodiment of the present invention.

The coupling structure 720 according to a seventh embodiment of the present invention includes a hooking portion 764-2, a hooking protrusion 159, a hooking groove 156, and a hitch projection 712.

Each of the first and second sidewalls 164-1 and 164-2 includes a hooking portion 764-2. A hooking protrusion 159 that inwardly protrudes is provided at a bottom end of the second sidewall portion 152, the hooking groove 156 is formed on the outside of the second sidewall portion 152, and the first sidewall portion 112 includes a hitch projection 712.

The hooking portion 764-2 is formed by inwardly pressing a portion of the second sidewall 164-2.

The hooking protrusion 159 is formed by inwardly protruding the bottom end of the second sidewall portion 152. The hooking groove 156 is formed on the outside of the second sidewall portion 152. In a case where the intermediate receiving container 150 is formed of a mold frame made of a plastic material, the hooking protrusion 159 and the hooking groove 156 can be simultaneously formed using plastic formation techniques.

The hitch projection 712 is formed by cutting a portion of the first sidewall portion 112 and inwardly bending an interior portion in view of the cutting line.

According to this embodiment, coupling between each of the bottom receiving container 160, the intermediate receiving container 150 and the top receiving container 110 is achieved such that the hooking portion 764-2 is coupled to the hooking protrusion 159 and the hitch projection 712 is coupled to the hooking groove 156.

Figure 9A:
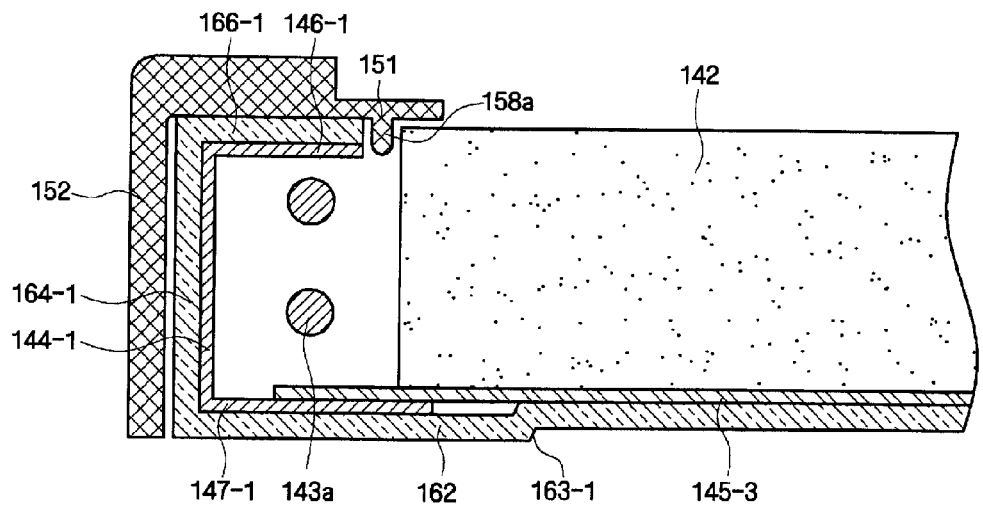
FIGS. 9A and 9B are cross-sectional views of a structure for preventing movement of an intermediate receiving container (150)
Figure 9B:
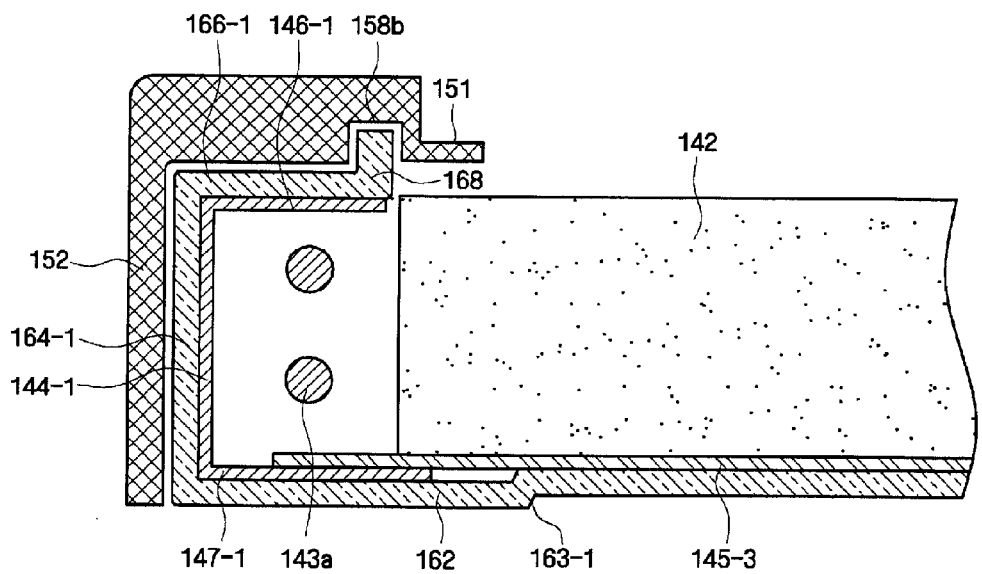

FIGS. 9A and 9B are cross-sectional views of a structure for preventing movement of an intermediate receiving container (150).

If an LCD is assembled through an automated fabrication process, it is desirable that the LGP 142 be capable of easy assembly onto the bottom receiving container 160. To this end, a predetermined gap is established between an end of the first or second top plate 166-1 of the bottom receiving container 160 and the LGP 142. However, this may allow the intermediate receiving container 150 and the LGP 142 to move within the LCD, which is undesirable. Accordingly, a structure capable of preventing the movement is required.

Referring to FIG. 9A, the structure capable of preventing the movement of the intermediate receiving container 150 according to an exemplary embodiment of the present invention includes a projecting portion 158a.

The projecting portion 158a is formed in the intermediate receiving container 150 to be positioned between an end of the first or second top plate 166-1 or 166-2 and the LGP 142. Here, the projecting portion 158a is preferably positioned at a location where the end of the first or second top plate 166-1 or 166-2 closely contacts the LGP 142. Accordingly, the projecting portion 158a is fixed between the end of the first or second top plate 166-1 or 166-2 and the LGP 142.

Referring to FIG. 9B, the structure capable of preventing the movement of the intermediate receiving container 150 according to another embodiment of the present invention includes a coupling groove 158b and a bending portion 168.

The coupling groove 158b is formed in the intermediate receiving container 150. The bending portion 168 is formed by cutting a portion of an end of the first or second top plate 166-1 or 166-2 and bending the cut portion toward the intermediate receiving container 150. In order to facilitate bending of the bending portion 168, a notch (not shown) may be formed. In order to prevent the movement of the intermediate receiving container 150, the bending portion 168 is inserted into the coupling groove 158b.

Meanwhile, in a case where the intermediate receiving container 150 is formed by a mold frame made of, for example, a plastic material, the projecting portion 158a and the coupling groove 158b may be simultaneously formed with the intermediate receiving container 150.

Accordingly, the movement of the intermediate receiving container 150 and the LGP 142 within the LCD can be prevented. In addition, a light leakage phenomenon can be prevented by preventing the movement of the intermediate receiving container 150 and the LGP 142. Further, it is possible to prevent the liquid crystal panel 136 or the optical sheet 141 from deviating from the receiving containers.

Figure 10:
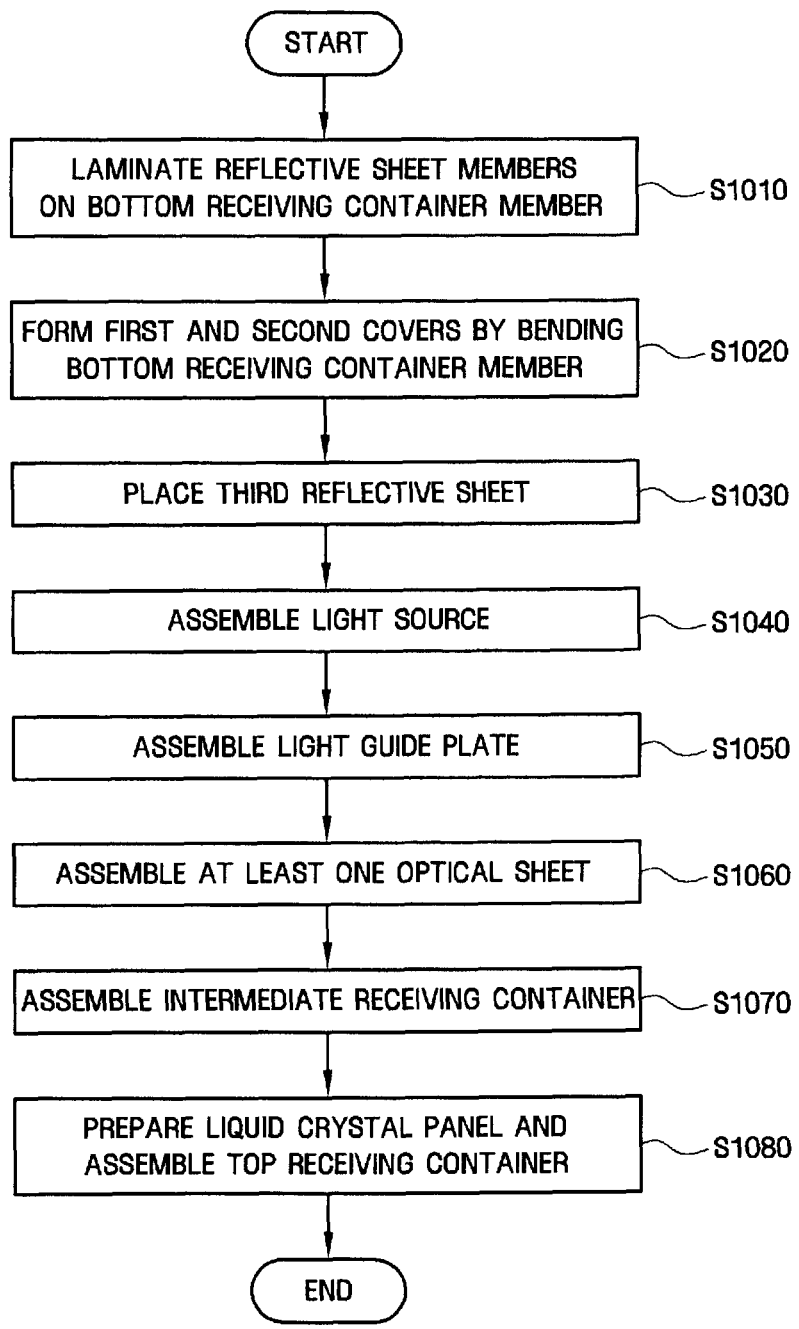
FIG. 10 is a flowchart illustrating a method of assembling an LCD according to the present invention.

FIG. 10 is a flowchart illustrating a method of assembling an LCD according to the present invention.

The method of assembling the LCD according to the present invention will be described in detail with reference to FIGS. 1 through 2D and FIG. 10.

A bottom receiving container member is prepared. The bottom receiving container member may be in the shape of a plate of a metallic material. Next, the respective reflective sheet members are laminated on first and second ends 1 and 2 of the bottom receiving container member (S1010). As a result, the first and second reflective sheet members 145-1 and 145-2 are formed. Here, each of the reflective sheet members may include an adhesive member, a reflective sheet, and a protection sheet. The adhesive member allows the reflective sheet to adhere to the first and second ends 1 and 2 of the bottom receiving container member. The reflective sheet reflects light. The protection sheet prevents the reflective sheet from cracking during fabrication of the bottom receiving container member. The protection sheet is later removed when bending or pressing the bottom receiving container member.

Subsequently, the first end 1 of the bottom receiving container member is bent to form the first cover 165-1 including the first sidewall 164-1 and the first top plate 166-1, and the second end 2 of the bottom receiving container member is bent to form the second cover 165-2 including the second sidewall 164-2 and the second top plate 166-2 (S1020). Accordingly, the bottom plate 162 and the first and second covers 165-1 and 165-2 are integrally formed with one another. Thus, the bottom receiving container 160 includes the integrally formed bottom plate 162 and the first and second covers 165-1 and 165-2.

In the bottom plate 162, first and second stepped portions 163-1 and 163-2 may further be formed to be adjacent to an end of each of the first and second reflective sheet films 147-1 and 147-2 respectively. Here, heights h1 and h2 of the first and second stepped portions 163-1 and 163-2 are equal to thicknesses t1 and t2 of the first and second reflective sheet films 147-1 and 147-2.

Next, the third reflective sheet member 145-3 is disposed on the bottom plate 162 (S1030), the first and second light sources 143a-1 and 143b-1 are assembled on the first and second covers 165-1 and 165-2, respectively (S1040), and the LGP 142 is installed on the third reflective sheet member 145-3 (S1050). The assembling and installing operations may be sequentially performed on the bottom receiving container 160 by a bottom-up assembling method.

Then, at least one optical sheet 141 is assembled and installed on the LGP 142 (S1060), and the intermediate receiving container 150 having the support portion 151 of the liquid crystal panel 136 is further assembled and installed on the bottom receiving container 160 (S1070).

Next, the liquid crystal panel 136 is installed to display an image by supplying light from the first and second light sources 143a-1 and 143b-1 on the LGP 142 of the intermediate receiving container 150.

Finally, the top receiving container 110 is assembled with the bottom receiving container 160 (S1080) to fabricate the LCD 100. The top receiving container 110 includes the top plate portion 111 having a window to expose the liquid crystal panel 136 outside, and the first sidewall portion 112 extending along the boundary of the top plate portion 111.

According to the above-described LCD 100 and the assembling method thereof, the LCD fabrication costs can be reduced, and a time required to fabricate the LCD 100 can also be reduced.

In detail, the LCD 100 does not require a separate lamp cover. Further, the integrally formed bottom receiving container 160 eliminates the need for an adhesive member such as an aluminum tape for attaching parts of a separate-type bottom receiving container, thus reducing the fabrication costs. In addition, as described above, the LCD 100 can be sequentially assembled by a bottom-up assembling method, thereby reducing a time required to fabricate and assemble the LCD 100 while enabling automatic assembling operations.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A liquid crystal display comprising:
a light guide plate (LGP) guiding light;
a light source that is disposed at either side of the LGP;
a bottom receiving container including a bottom plate disposed below the LGP and the light source and a cover that covers the light source and is integrally formed with the bottom plate, the cover having sidewalls extending from the bottom plate;
a reflective sheet member laminated inside the cover facing the light source;
a reflective sheet positioned on the bottom plate;
a liquid crystal panel receiving the light from the light source and displaying an image;
a top receiving container including a top plate having a window overlapping the liquid crystal panel and a first sidewall portion extending along the boundary of the top plate; and
an intermediate receiving container including a supporting portion on which the liquid crystal panel is seated and a second sidewall portion extending from the supporting portion, the intermediate receiving container disposed between the bottom receiving container and the top receiving container,
wherein a bottom end of the second sidewall portion is bent to enclose each corner of the bottom receiving container where the sidewalls meet the bottom plate and a bottom end of the first sidewall portion is bent to enclose the bottom end of the second sidewall portion.

2. A liquid crystal display comprising:
a light guide plate (LGP) guiding light;
a light source that is disposed at either side of the LGP;
a bottom receiving container including a bottom plate disposed below the LGP and the light source and a cover that covers the light source and is integrally formed with the bottom plate, the cover having sidewalls extending from the bottom plate;
a reflective sheet member laminated inside the cover facing the light source;
a reflective sheet positioned on the bottom plate;
a liquid crystal panel receiving the light from the light source and displaying an image;
a top receiving container including a top plate having a window overlapping the liquid crystal panel and a first sidewall portion extending along the boundary of the top plate; and
an intermediate receiving container including a supporting portion on which the liquid crystal panel is seated and a second sidewall portion extending from the supporting portion, the intermediate receiving container disposed between the bottom receiving container and the top receiving container,
wherein the sidewalls are bent to form an obtuse angle with respect to the bottom plate, the first sidewall portion is bent to be parallel with the sidewalls, and the sidewalls and the first sidewall portion contact each other.

3. A liquid crystal display comprising:
a light guide plate (LGP) guiding light;
a light source that is disposed at either side of the LGP;
a bottom receiving container including a bottom plate disposed below the LGP and the light source and a cover that covers the light source and is integrally formed with the bottom plate, the cover having sidewalls extending from the bottom plate;
a reflective sheet member laminated inside the cover facing the light source;
a reflective sheet positioned on the bottom plate;
a liquid crystal panel receiving the light from the light source and displaying an image;
a top receiving container including a top plate having a window overlapping the liquid crystal panel and a first sidewall portion extending along the boundary of the top plate; and
an intermediate receiving container including a supporting portion on which the liquid crystal panel is seated and a second sidewall portion extending from the supporting portion, the intermediate receiving container disposed between the bottom receiving container and the top receiving container,
wherein the sidewalls include hooking protrusions formed by outwardly pressing portions of the sidewalls, the second sidewall portion includes a coupling hole, and the first sidewall portion includes a hitch projection formed by cutting a portion of the first sidewall portion and inwardly bending an interior portion in view of the cutting line, wherein the hooking protrusion is coupled to the bottom end of the coupling hole, and the hitch projection is coupled to the top end of the coupling hole.

4. The liquid crystal display of claim 3, wherein a width of the hooking protrusion is smaller than a thickness of each of the sidewalls.

5. A liquid crystal display comprising:
a light guide plate (LGP) guiding light;
a light source that is disposed at either side of the LGP;
a bottom receiving container including a bottom plate disposed below the LGP and the light source and a cover that covers the light source and is integrally formed with the bottom plate, the cover having sidewalls extending from the bottom plate;
a reflective sheet member laminated inside the cover facing the light source;
a reflective sheet positioned on the bottom plate;
a liquid crystal panel receiving the light from the light source and displaying an image;
a top receiving container including a top plate having a window overlapping the liquid crystal panel and a first sidewall portion extending along the boundary of the top plate; and an intermediate receiving container including a supporting portion on which the liquid crystal panel is seated and a second sidewall portion extending from the supporting portion, the intermediate receiving container disposed between the bottom receiving container and the top receiving container, wherein the sidewalls include a hooking protrusion formed by outwardly pressing portions of the sidewalls, and the bottom end of the first sidewall portion is bent to enclose the hooking protrusion.

6. A liquid crystal display comprising:

a light guide plate (LGP) guiding light;

a light source that is disposed at either side of the LGP;

a bottom receiving container including a bottom plate disposed below the LGP and the light source and a cover that covers the light source and is integrally formed with the bottom plate, the cover having sidewalls extending from the bottom plate;

a reflective sheet member laminated inside the cover facing the light source;

a reflective sheet positioned on the bottom plate;

a liquid crystal panel receiving the light from the light source and displaying an image;

a top receiving container including a top plate having a window overlapping the liquid crystal panel and a first sidewall portion extending along the boundary of the top plate; and an intermediate receiving container including a supporting portion on which the liquid crystal panel is seated and a second sidewall portion extending from the supporting portion, the intermediate receiving container disposed between the bottom receiving container and the top receiving container, wherein the sidewalls include a hooking portion formed by inwardly pressing portions of the sidewalls, the bottom end of the second sidewall portion includes a hooking protrusion inwardly protruding, a hooking groove is formed on the outside of the second sidewall portion, and the first sidewall portion includes a hitch projection formed by cutting a portion of the first sidewall portion and inwardly bending an interior portion in view of the cutting line wherein the hooking portion is coupled to the hooking protrusion, and the hitch projection is coupled to the hooking groove.

7. A liquid crystal display comprising:

a light guide plate (LGP) guiding light;

a light source that is disposed at either side of the LGP;

a bottom receiving container including a bottom plate disposed below the LGP and the light source and a cover that covers the light source and is integrally formed with the bottom plate;

a reflective sheet member laminated inside the cover facing the light source;

a reflective sheet positioned on the bottom plate;

a liquid crystal panel receiving the light from the light source and displaying an image;

a top receiving container including a top plate having a window overlapping the liquid crystal panel and a first sidewall portion extending along the boundary of the top plate; and an intermediate receiving container including a supporting portion on which the liquid crystal panel is seated and a second sidewall portion extending from the supporting portion, the intermediate receiving container disposed between the bottom receiving container and the top receiving container, wherein the intermediate receiving container includes a projecting portion, which is positioned between the end of the top plate and the LGP.

8. A liquid crystal display comprising:

a light guide plate (LGP) guiding light;

a light source that is disposed at either side of the LGP;

a bottom receiving container including a bottom plate disposed below the LGP and the light source and a cover that covers the light source and is integrally formed with the bottom plate;

a reflective sheet member laminated inside the cover facing the light source;

a reflective sheet positioned on the bottom plate;

a liquid crystal panel receiving the light from the light source and displaying an image;

a top receiving container including a top plate having a window overlapping the liquid crystal panel and a first sidewall portion extending along the boundary of the top plate; and an intermediate receiving container including a supporting portion on which the liquid crystal panel is seated and a second sidewall portion extending from the supporting portion, the intermediate receiving container disposed between the bottom receiving container and the top receiving container, wherein the bottom receiving container includes a bending portion formed by bending a portion of the top plate in a direction of the intermediate receiving container, and the intermediate receiving container includes a coupling groove, the bending portion inserted into the coupling groove.

* * * * *